(12) United States Patent
Tapp

(10) Patent No.: US 7,029,579 B2
(45) Date of Patent: Apr. 18, 2006

(54) SYSTEM FOR SOLID-LIQUID SEPARATION

(76) Inventor: Floyd G. Tapp, 4153 Hwy. 142, Box 143, Philpot, KY (US) 42366

( * ) Notice: Subject to any disclaimer, the term of this patent is extended or adjusted under 35 U.S.C. 154(b) by 113 days.

(21) Appl. No.: 10/746,425

(22) Filed: Dec. 22, 2003

(65) Prior Publication Data

US 2004/0134863 A1 Jul. 15, 2004

Related U.S. Application Data

(60) Provisional application No. 60/436,233, filed on Dec. 26, 2002.

(51) Int. Cl.
*B01D 33/048* (2006.01)

(52) U.S. Cl. .................. 210/193; 210/387; 210/391; 210/393; 210/400; 210/783

(58) Field of Classification Search ........... 210/350, 210/351, 387, 400, 401, 783
See application file for complete search history.

(56) References Cited

U.S. PATENT DOCUMENTS

| | | | | |
|---|---|---|---|---|
| 2,867,324 A * | 1/1959 | Hirs | ......... | 210/97 |
| 3,306,458 A * | 2/1967 | Hirs | ......... | 210/333.1 |
| 3,333,693 A * | 8/1967 | Hirs | ......... | 210/741 |
| 3,731,808 A * | 5/1973 | Rickert | ......... | 210/138 |
| 3,899,426 A * | 8/1975 | Hirs | ......... | 210/387 |
| 4,008,158 A * | 2/1977 | Davis | ......... | 210/386 |
| 4,153,550 A * | 5/1979 | Lautrette | ......... | 210/770 |
| 4,233,157 A * | 11/1980 | Miller | ......... | 210/137 |
| 4,267,060 A * | 5/1981 | Miller | ......... | 210/741 |
| 4,477,350 A * | 10/1984 | Brandt et al. | ......... | 210/387 |
| 5,209,841 A * | 5/1993 | Bratten | ......... | 210/107 |
| 5,366,626 A * | 11/1994 | Pierson | ......... | 210/216 |
| 5,462,677 A * | 10/1995 | Benesi | ......... | 210/791 |
| 5,573,667 A * | 11/1996 | Benesi | ......... | 210/400 |
| 5,601,729 A * | 2/1997 | Bratten | ......... | 210/783 |
| 6,093,315 A * | 7/2000 | Croket | ......... | 210/168 |
| 6,117,339 A * | 9/2000 | Croket | ......... | 210/780 |
| 2004/0134863 A1* | 7/2004 | Tapp | ......... | 210/783 |
| 2004/0206709 A1* | 10/2004 | Buisman et al. | ......... | 210/783 |

* cited by examiner

*Primary Examiner*—Robert James Popovics
*Assistant Examiner*—T. Woodruff
(74) *Attorney, Agent, or Firm*—Gary K. Price, Esq.

(57) ABSTRACT

A system for use in filtering a slurry using air pressure to squeeze the slurry material and dewatering it. The system including a source of slurry, a chamber, a filter belt that passes through the chamber, a manifold inlet supplying the slurry to a first side of the filter belt to form a uniform moist cake of the filter material, an inlet seal and an outlet seal to seal a belt inlet and a belt outlet formed on the chamber, and a source of the pressurized air selectively applicable to the chamber to dry the moist cake of filtered material.

9 Claims, 6 Drawing Sheets

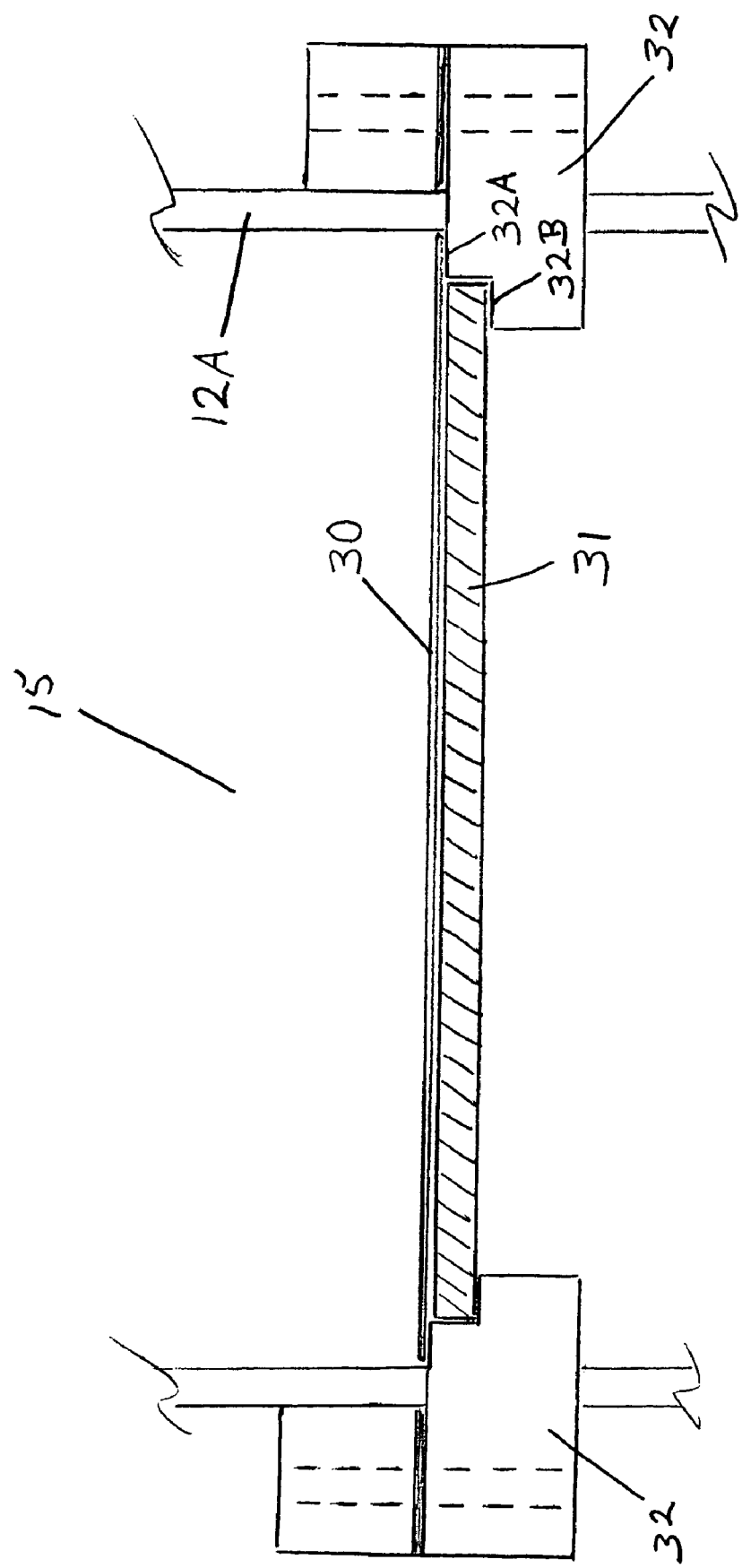

SYSTEM FOR SOLID-LIQUID SEPARATION

CROSS REFERENCES TO RELATED APPLICATIONS

U.S. Provisional Application for Patent 60/436,233, filed Dec. 26, 2002, with title, "System for Solid-Liquid Separation" which is hereby incorporated by reference. Applicant claims priority pursuant to 35 U.S.C. Par. 119(e)(I).

Statement as to rights to inventions made under federally sponsored research and development: Not applicable.

BACKGROUND OF THE INVENTION

1. Field of the Invention

The present invention relates generally to dewatering equipment and more particularly, to a system that semi-continuously filters both fibrous materials and particulate materials from slurries, producing a substantially dry filter cake. The system further deposits the cake in containers, and when required, returns the relatively clean filtrate to be reused.

2. Brief Description of Prior Art

Solid-liquid separation is a major unit operation that exists in almost every flow scheme related to the chemical process industries, ore beneficiation, pharmaceutics, food, or water and waste treatment. The lack of cost effective equipment to handle these major unit operations and the enormous pollution problems caused by fluid production systems has resulted in industries abandoning many thousands of refuse ponds. The coal industry has created several hundred coal refuse slurry ponds holding an estimated 2 to 3 billion tons of discarded fine coal particles. Each year an estimated 30 million more tons are discarded into these waste ponds. Most of these slurry ponds are abandoned, un-monitored, and pose an enormous environmental hazard.

Existing methods of slurry management by industry using slurry ponds, concrete pools or plastic lined pools for slurry storing or processing are not environmentally sound. Tighter governmental monitoring of slurry ponds has brought about the need for active solid-liquid separation devices that are both economical and environmental effective. Prior art systems have not been effective. Many such prior art systems are not automated or continuous, or semi-continuous. Such prior art systems typically use disposable filter or cloth. Other systems may also use elastomeric diaphragms which limit the chamber size. Others apply heat or chemicals or both which reduce the reliability and raise the cost of operation. Centrifuges and belt presses have not been the answer in most cases. Some inventions use compression chambers that separate with an upper part and lower part that require hundreds of thousands pounds of force to hold the two parts together. Although these work for low throughputs, the design limits their applications and the cost per gallon slurry processed is high. Some use stacked multiple chambers increasing the complexity and manufacturing costs while reducing the reliability. Vacuum disc filters have proved unreliable, have low throughput, and fail to produce "dry" solids that meet industry standards. Others have tried the vacuum-atmosphere technique, with and without membranes, which has not been effective in creating "dry" solids.

Dewatering equipment can be used to clean up these environmental liabilities. The dewatering equipment needed must be of reasonable cost, non-labor intensive, reliable, adaptable to different slurries, and able to handle high throughput. It must make the disposal of or reuse of the treated materials both economical and environmental effective.

As will be seen from the subsequent description, the preferred embodiments of the present invention overcome short comings of the prior art.

SUMMARY OF THE INVENTION

More throughput for less cost while meeting industry "dry" solids standards is the principal objective of the present invention. Poiseuille's Law as applied to filter cakes confirms that the higher the pressure the faster the liquid flows through the filter cake. The present invention uses air pressure to squeeze the filter cake and dewater it. Air pressure is the optimum method for dewatering a uniformly distributed cake. It is more troublefree than methods using membranes or diaphragms and air moving through the cake helps to produce a substantially dry cake.

The design of the present invention allows the operator to adjust both the time intervals and amount of pressure for the cake buildup and for the cake dewatering. These variables are adjusted to optimize the dewatering cycle for maximum throughput per hour.

From the equation, pressure=force/area ($P=F/A$), to have enough pressure to perform the squeeze and have enough area for high throughput requires a very high force. The higher the force the costlier the equipment plus reliability and leaks become a problem. Unlike U.S. Pat. No. 5,573,667 that uses separable plate members that require up to one million pounds of force to hold the plates together during this squeeze, the present invention uses a fixed filter chamber with openings and sealing means at each end of the chamber for entrance and exit of a filter belt. The openings require very little force to actuate or keep closed during the squeeze cycle. Both structural find economical requirements limit the maximum width of each opening to between 4 and feet. As long as the width of the belt and the chamber width is of this optimum width (4 to 6 feet), the length of the chamber can vary for the job at hand and the cost of manufacturing the apparatus remains reasonable. For a four foot wide belt, the filter area can vary from 32 to 96 square feet. For extremely high throughputs, two or more chambers can be connected in parallel and operated by the same computer.

Keeping the filter belt narrow has several advantages. A long, narrow chamber is much easier to design and build to handle high pressures. An interior four foot filter belt grid requires a lot less structural strength than one eight foot wide. Four foot wide doors are also a lot less likely to warp under pressure than 8 foot doors. Further, uniform distribution of the solids on the filter belt is easier to achieve in a relatively narrow, rectangular chamber.

For different applications, only the length of the chamber changes; the doors, the belt washer, the rollers, the catch tray, are preferably for an approximate four foot wide filter belt. This all adds up to cost savings plus keeping the system narrow as discussed above also makes it easy to transport.

BRIEF DESCRIPTION OF THE DRAWINGS

FIG. 2B is an enlarged cross-sectional view illustrating the filter belt, filter belt grid, and sealing shelf within the system's chamber.

DESCRIPTION OF THE PREFERRED EMBODIMENTS

In accordance with the present invention, a system for solid-liquid separation 10 is disclosed. The system 10 provides semi-continuous filtering of both fibrous materials and particulate materials from slurries, producing the required dry filter cake. The system 10 generally uses a fixed filter chamber member with openings at each end of the chamber for entrance and exit of a filter belt. The openings each include sealing means that require very little force to actuate, or keep closed during the squeeze cycle. In general, the present invention uses an air operated seal to seal the entrance opening for the filter belt, and a special gasket arrangement that seals the exit opening. Linear actuators known in the art are used to close the exit of the chamber for the cake buildup and squeeze cycles, and to open the exit for the discharge of the dry cake. These preferred embodiments save not only in the cost of operating the equipment, but in manufacturing the system 10.

Figure 1:
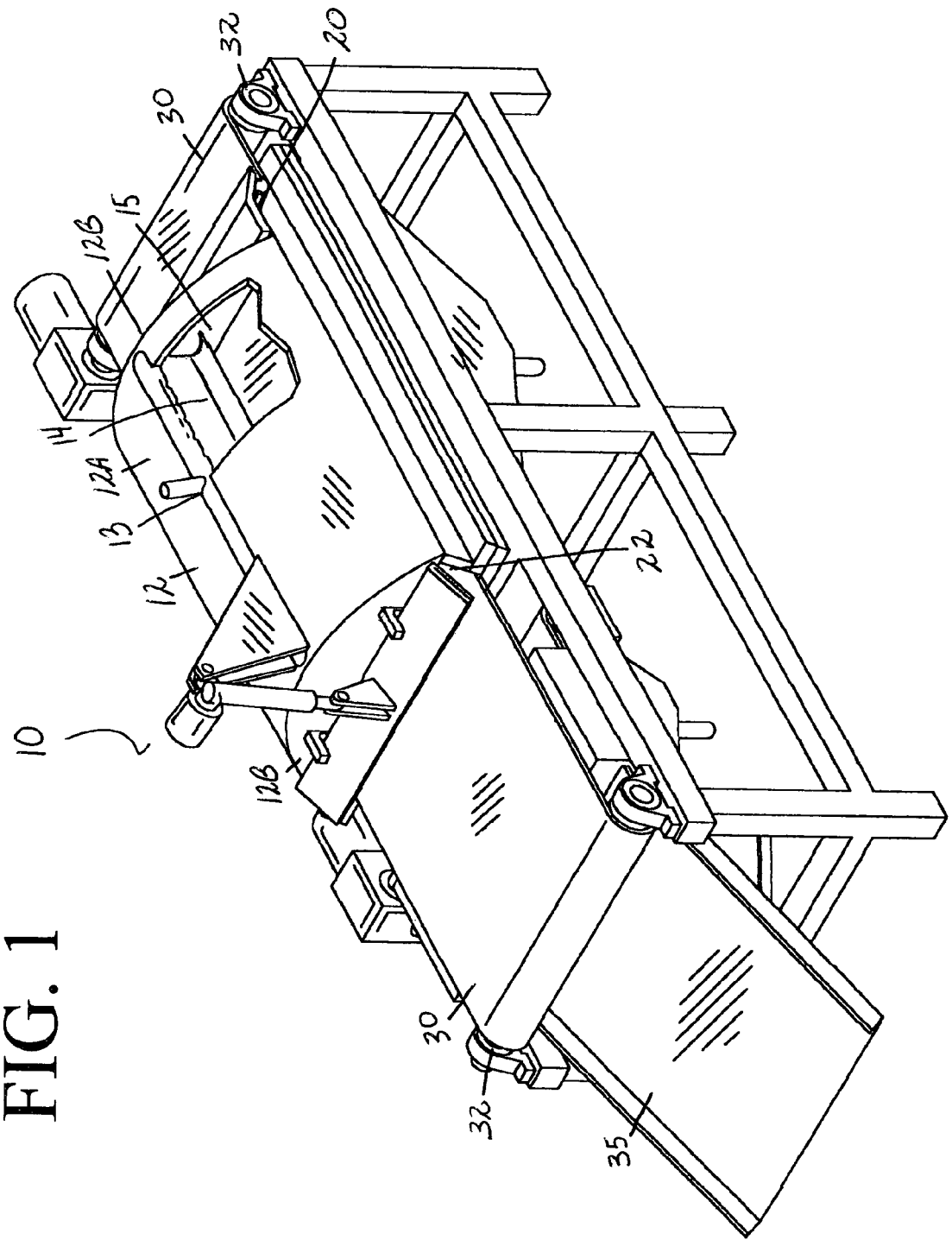
FIG. 1 is a perspective partial sectional view of the present invention, a system for solid-liquid separation.

FIGS. 1–4 illustrate a preferred embodiment of the system for solid-liquid separation 10 made in accordance with the present invention. FIG. 1 is a perspective view of the system 10. The system 10 includes a chamber member 12 having at least one entrance opening 20 and at least one exit opening 22, for entrance and exit of a filter belt 30. As shown in FIG. 1, the chamber 12 further having a top wall 12A, and end walls 12B that define an inner chamber 15.

As shown in FIG. 2B, the chamber member 12 further includes an internal filter grid 31 positioned on a sealing shelf 32 that extends the perimeter of the filter belt grid 31. In application, the filter belt 30 moves along the filter belt grid 31 within the chamber member 12. In particular, the filter belt 30 is disposed on a first shelf 32A of the sealing shelf 30, and the filter belt grid 31 is disposed on a second shelf 32B of the sealing shelf 32.

The basic operating principle of the system 10 consists of three phases: In the first phase, slurry 100 (see FIG. 4) is pumped with a slurry pump 102 at a high rate into the chamber member 12 at the location designated "A" in FIG. 4. The slurry 100 collects (not shown) on the filter belt 30 within the chamber 15. As the solids begin to build up on the belt 30, the solids 110 become the main filter element, and a seal is formed between the filter belt 30 and the first shelf 32A by the solids within the slurry 100. Filtrate 115 is cleaned and recycled back for reuse. As the solids 110 become thicker and more dense, the speed of the filtrate 115 through the solids 110 slow to a point where it is more efficient to stop the slurry pump and do the squeeze. The second phase has air pressure 104 between two and six atmospheres supplied to the chamber 15. The squeeze from the pressure removes the remaining filtrate 115 from the solids 110 until the moisture reaches a specified level. Phase three consists of releasing the sealing means as will be discussed thereby opening the entrance and exit openings 20, 22, and turning the filter belt 30. As the belt 30 turns over rollers 32, the cake of solids 110 break up and is preferably deposited down a chute 35 (shown in FIG. 1) into all awaiting container (not shown). The filter belt 30 can move in and out of the chamber 15 of the chamber member 12 by manual cranking or, an electric motor(s) (not shown) can be used to turn the filter belt 30. In the alternative, a continuous belt can be used.

Figure 2:
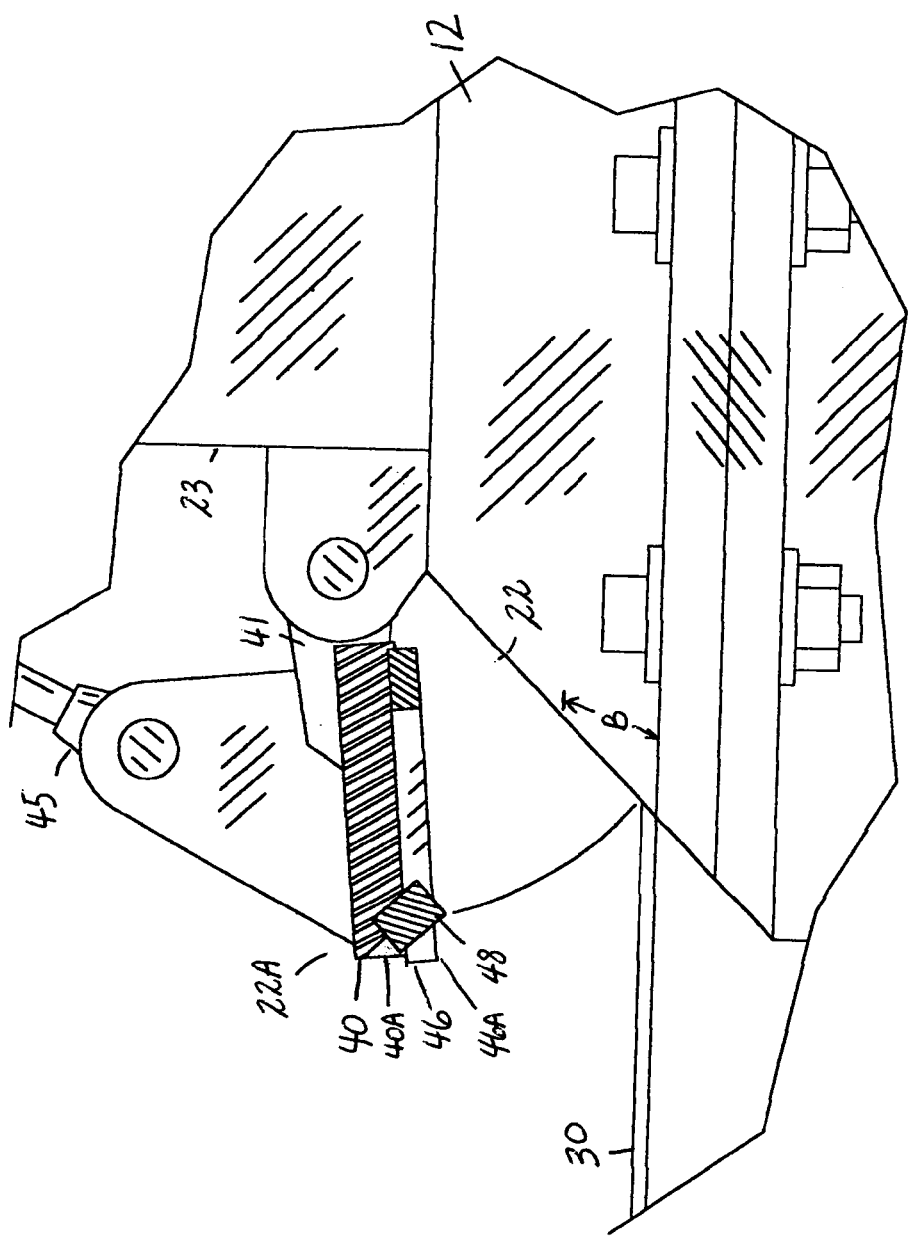
FIG. 2 is an enlarged side partial sectional view of the exit sealing means to the system's chamber.

FIG. 2 is an enlarged side view of the exit opening 22 and exit sealing means 22A of the present invention. In particular, the exit sealing means 22A includes a hinged door 40 hinged to an upper surface 23 adjacent the exit opening 22 using connections 41 known in the art. Linear actuators 45 are used to open and close the door 40 in relation to the exit opening 22.

Figure 2A:
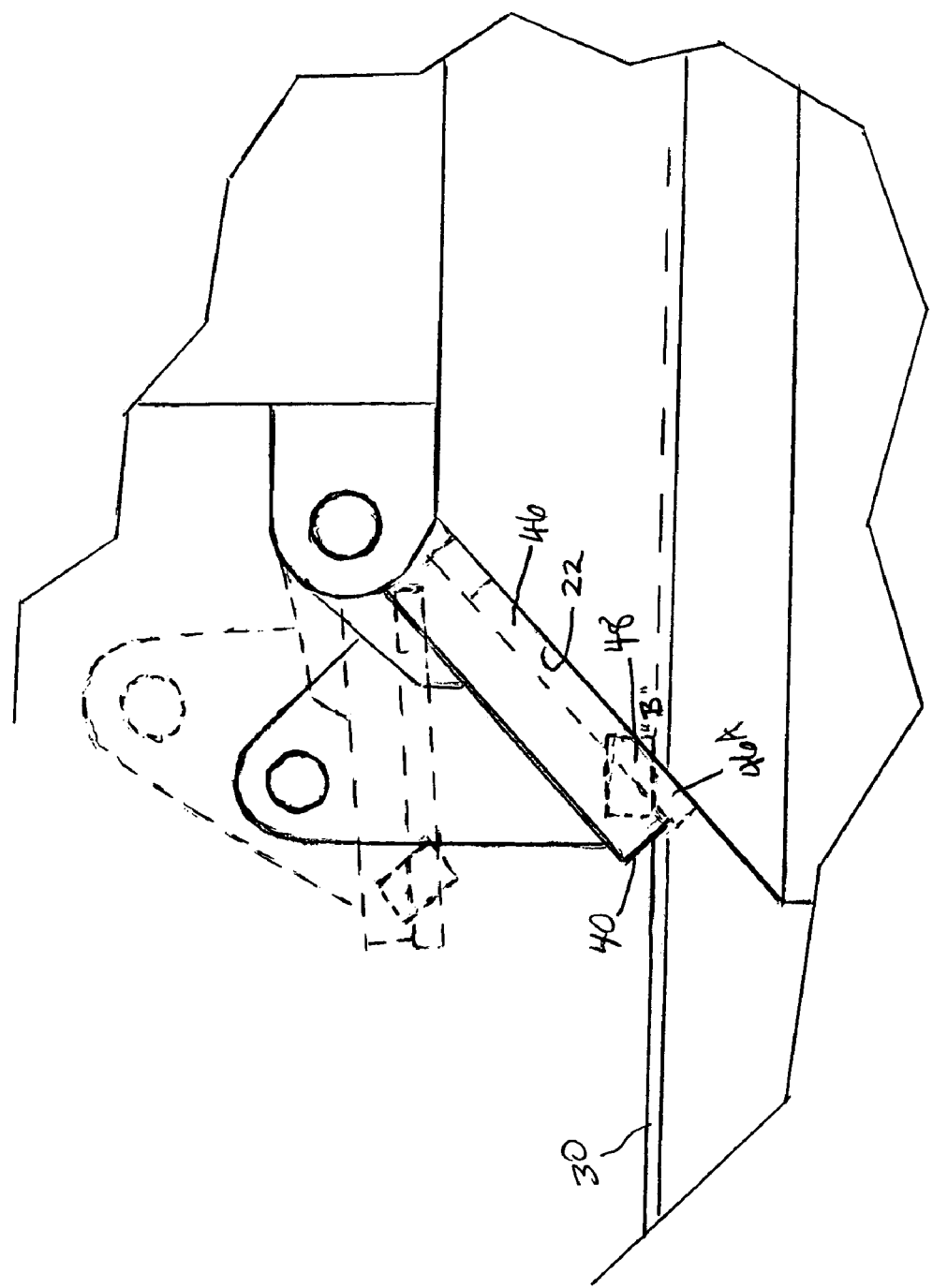
FIG. 2A is an enlarged side partial sectional view of the exit sealing means of FIG. 2 in a closed position.

As shown in FIG. 2, the exit opening 22 in relation to the chamber member 12 is constructed having an angled opening designated as letter "B", preferably a 60 degree angle opening. The door 40 includes an end 40A. A first gasket 46 is affixed to the end 40A of the door 40 and extends along a surface 46A, and past horizontal gasket 48. When the door 40 is in the closed position as shown in FIG. 2A, the surface 46A is in sealing contact with the edges of the filter belt 30.

The gasket 48 is affixed to the inside of the first gasket 46. The gasket 48 is preferably disposed at a 35 degree angle. When the door 40 is in the closed position, the gasket 48 is in sealing contact with the top surface of the filter belt 30. In the preferred embodiment, both the angle B of 60 degrees and the angle of 35 degrees of gasket 48 as described above are such as to minimize the wear of the gaskets and filter belt.

Figure 3:
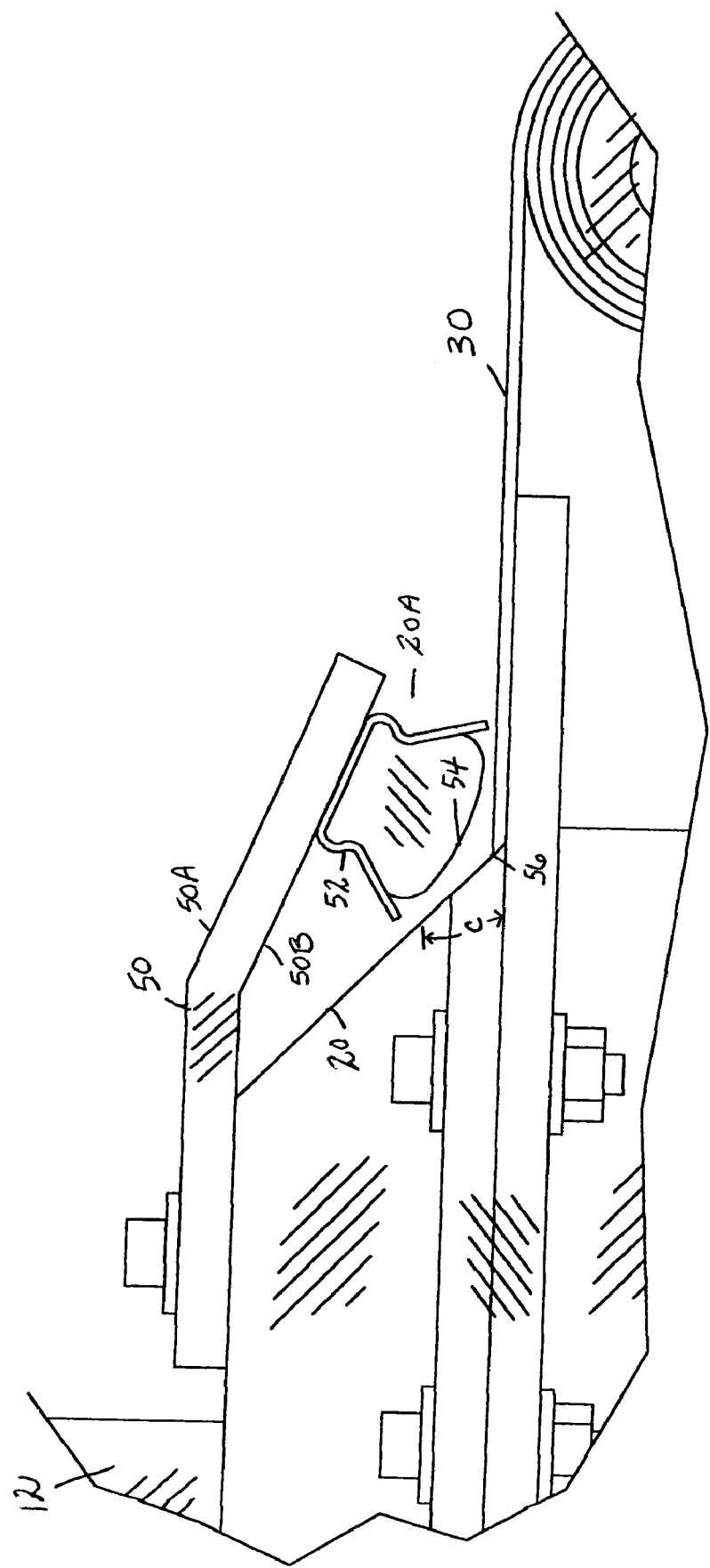
FIG. 3 is an enlarged side view of the entrance sealing means to the system's chamber.

FIG. 3 is an enlarged view of the entrance opening 20 and entrance sealing means 20A. FIG. 3 illustrates the sealing means 20A in an open position. In particular, the chamber member 12 includes an angled projection member 50 that outwardly extends from the upper surface of the chamber member 12. The projection member 50 having a top surface 50A and a lower surface 50B. A seal 52 is appropriately attached to the lower surface 50B of the projection member 50 so that the seal 52 is disposed directly above the filter belt 130 at entrance slot 56. The seal 52 extends the necessary distance past the edges of the filter belt 30 to secure a sealing at the belt edges. In the preferred embodiment, the seal 52 is an air operated seal known in the art.

As shown in FIG. 3, the entrance opening 20 in relation to the chamber member 12 is constructed having an angle opening designated as letter "C", preferably a 45 degree angle. Further, for proper sealing, the seal 52 is attached to the projection member 50 so that a midpoint 54 is positioned directly above the entrance slot 56.

In application, the seal 52 shown deflated in FIG. 3, can be expanded so that a compression seal exists between the seal 52 and the filter belt 30 and in particular, where the midpoint 54 of the projection member 50 contacts the entrance slot 56.

FIG. 1 shows the generally rectangular shaped chamber member 12 that the inventor has found optimum. It is imperative to have as wide a filter belt 30 as possible and still keep the cost of the apparatus reasonable. At four feet, the wall thickness and costs are reasonable. Any wider than four feet, the cost starts increasing quickly. If more throughput is required, the chamber member 12 can easily be made longer up to approximately twenty-four feet. Ninety-six square feet of filter area can process thousands of gallons of normal slurry per hour. It is obvious that the cost of the apparatus per foot filter area goes down as the chamber member 12 gets larger.

From the equation, pressure=force/area ($P=F/A$) one can see that to have enough pressure to do the squeeze in a reasonable time and enough area for the required throughput, one must use an enormous amount of force. Force is directly related to expense, therefore it appears to be a very expensive concept. For example, the force required to hold two chambers together while applying 100 pounds per square inch of pressure on 100 square feet of filter area is almost 1.5 million pounds of force. U.S. Pat. No. 5,573,667 uses massive hydraulic presses and a super structure made of massive amounts of material to perform the job. Knowing force (F) is the variable in the equation that is more directly a function of the cost of the equipment, the present inventor designed a system that uses said fixed chamber member 12 with the openings 20, 22 for the entrance of the filter belt 30 into the chamber 15, and to remove the dry solids 110 from the chamber 15.

The described sealing means 20A, 22A, require basically no energy to sealingly hold closed during the slurry pumping phase or the squeeze phase, and little energy to move to the open or closed position. Preferably, opening the entrance sealing means 20A is preferably just enough for the filter belt 30 to enter the chamber 15 through the entrance opening 20. Likewise, the door 40 at the exit opening 22 is minimally opened and closed as required. In particular, opening the exit sealing means 22A so that the filter belt 30 and dry solids 110 can exit the chamber 15 through the exit opening 22. By using an air operated seal 52 to seal the entrance opening 20 as discussed above, and using the linear actuators 45 with the first and second gasket 46, 48 arrangement for sealing the exit opening 22, one experienced in the art can see that the system 10 is easily automated.

The present invention is designed to be as reliable and trouble free as possible with few moving parts. The application of the air operated seal 52 to form an airtight seal on the filter belt 30 at the entrance opening 20 of the chamber 12 as discussed, is the preferred method. The unique method of having the air seal 52 attached to the angled projection member 50 so that the seal 52 activates at an angle as shown in FIG. 3, reduces the internal torque on the seal, increases the sealing area, and minimizes wear therefore increasing reliability.

An important way this invention minimizes wear and improves reliability is by having the exit sealing means 22A close and seal to the filter belt 30 at an angle as discussed. Another aspect of this invention is the unique application for sealing the edges 31 of the filter belt 30. When the exit sealing means 22A is in the closed position, the gasket 48 affixed to the first gasket 46 of the door 40 so that surface 46A extends below the edge of the filter belt 30 so when the door 40 is closed, the peal squeezes towards the filter belt 30 sealing the edges 31.

Another important aspect of the present invention is the method used to evenly distribute the solids as a buildup on the filter belt 30. The preferred embodiment uses a distribution manifold 13 with an internal disperser 14 disposed within the chamber member 12 to supply the slurry to the contents within the chamber 15. Without an evenly distributed solid cake, the air pressure will not effectively squeeze the filtrate from the cake.

Figure 4:
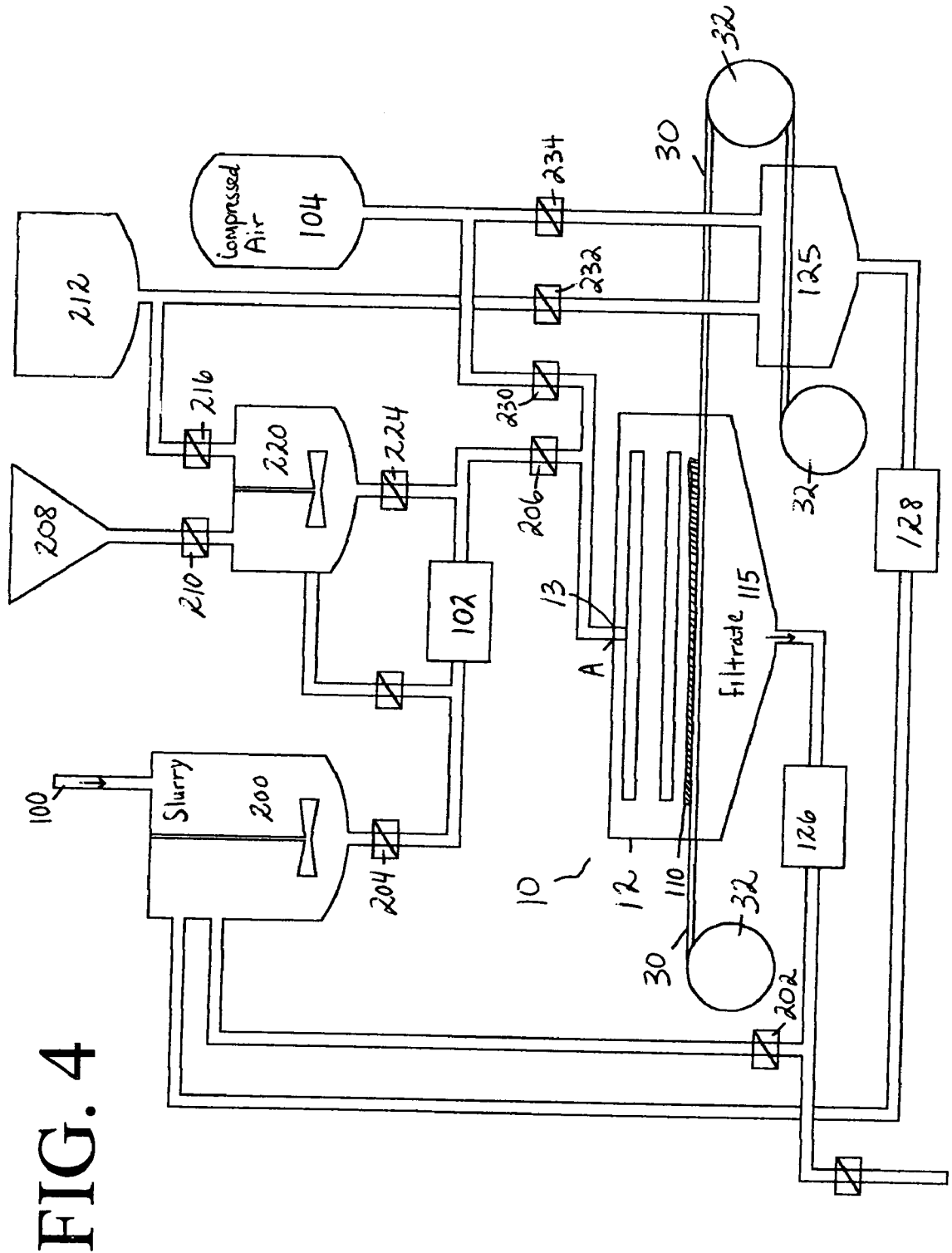
FIG. 4 is a schematic view of the present invention including optional equipment.

After the slurry 100 is pumped into the chamber 15 and the solid cake 110 is built up to the required thickness, the present invention has a method for drawing the remaining slurry left on top of the cake 110 back to the slurry mixing tank using a pump 126, as shown in FIG. 4. This conserves energy, reduces the squeeze time, third increases the throughput per hour.

Further detailing the operation of the system 10 with references to FIG. 4, slurry 100 is brought into mixer tank 200. The slurry can be combined with filtrate introduced by valve 202 and recycled belt cleaning water from pump 128. When the valve 204 opens, the slurry mix can flow through pump 102 to the valve 206. Prior to opening valve 206, a precoat feed 208 can supply belt precoat material through valve 210. The precoat material can be mixed with water from a supply 212 through valve 216. The belt precoat mixes with the water in mixer 220 and can flow through valves 224 and 206 to precoat the belt 30 within chamber 12. The precoat material makes the belt 30 easier to clean for example depending upon the slurry the system 10 is used on. Slurry material can then flow through the input A and manifold 13 onto the belt 30 until the thickness of the solids cake 110 reaches the point where slurry flow falls below a desired level. Air pressure from compressed air tank 104 is applied to chamber 12 through the valve 230. The pressure will squeeze the filtering material into a relative dry cake 110. The valve 230 is closed and chamber 12 is opened so that belt 30 can be moved by rollers 32. Cake 110 will break off the belt 30 when it passes over a roller 32. Any material stuck to the belt 30 can be washed off in belt washer 125 using water from supply 212 through the valve 232 and/or compressed air from tank 104 through valve 234. The water and air in belt washer 125 can be applied to the opposite side of the belt from where material was caked to aid in the removal. The valves, belt and seals shown can be controlled manually or can be operated and controlled automatically by an automatic controller such as a programmable controller not shown.

FIG. 4 further illustrates the system 10 with optional equipment. Some slurries are more gelatinous and require belt precoating to help the solids separate from the belt 30. Other slurries require body-aid and some require precoating and body-aid. Some industries have value in the solids and require one or more cake wash cycles. A belt washer 125 is necessary to clean the filter belt 30 in certain applications. Other slurries require only the combined belt cleaning properties of an air pressure cleaning rod (not shown) and the top edge of the chute 35 as a scraper. After testing the slurry, a custom dewatering apparatus is built with the options necessitated by that specific slurry.

From the foregoing, it is seen that the present invention provides an effective and efficient means for solid-liquid separation that is cost effective and easily transportable.

Although the description above contains many specificities, these should not be construed as limiting the scope of the invention but is merely providing illustrations of the presently preferred embodiments of the present invention.

Thus the scope of the invention should be determined by the appended claims in the formal application and their legal equivalents, rather than by the examples given.

I claim:

1. A system for use in filtering a slurry comprising:
   a source of slurry having solids,
   a fixed chamber having an inlet and an outlet formed therein,
   a continuous loop filter belt passing along a filter belt grid within said chamber, said filter belt grid positioned on a sealing shelf,
   a manifold inlet having an internal disperser that supplies slurry to a first side of said filter belt to form a uniformly distributed moist cake of filtered material,
   an inflatable inlet seal to seal said inlet,
   a source of pressurized air selectively applicable to said chamber to dry said moist cake of filtered material, and
   a hinged door operable to open and close said outlet wherein said door carries a door mounted portion of an outlet seal and wherein said door mounted outlet seal seals against the first side of said belt.

2. The system as recited in claim 1, wherein the filter belt is disposed on a first shelf of the sealing belt, and the filter belt grid is disposed on a second shelf of the sealing shelf, wherein a seal is formed between the filter belt and the first shelf by the solids within the slurry.

3. The system as recited in claim 2, including a source of pretreatment to coat said filter belt.

4. The system as recited in claim 3, wherein said filter belt passes through a belt washer and wherein said source of slurry includes a mixing tank adapted to receive recycle water from said belt washer and wherein said belt washer also uses said source of pressurized air to blow material off said belt after said washer.

5. The system as recited in claim 1, wherein said filter belt is roller mounted such that when said seals are in an open position said belt can transfer material from said chamber belt outlet.

6. A system for use in filtering a slurry of water and solids comprising:
   a source of slurry,
   a fixed chamber,
   a filter belt passing through said chamber,
   a manifold inlet supplying slurry to a first side of said filter belt,
   an inlet seal and an outlet seal to seal a belt inlet and a belt outlet formed on said chamber, and
   a source of pressurized air selectively applicable to said chamber when said chamber is sealed and wherein,
   said filter belt can be driven through a belt washer and wherein said source of slurry includes a mixing tank adapted to receive recycle water from said belt washer and wherein said belt washer uses compressed air to blow material off said belt, and including a hinged door operable to close said belt outlet wherein said door carries seals that seal said chamber by forming a seal with said belt outlet and with said belt including an edge of said belt.

7. The system as recited in claim 6, wherein the filter belt can be selectively driven such that a portion of said belt can be moved into said chamber and then out of said chamber.

8. The system as recited in claim 7, wherein said filter belt is roller mounted.

9. The system as recited in claim 7, wherein said inlet seal is an inflatable compression seal such that when said inlet seal is inflated its seals said chamber by forming a seal with said belt inlet and said filter belt.

* * * * *